Figure 1:
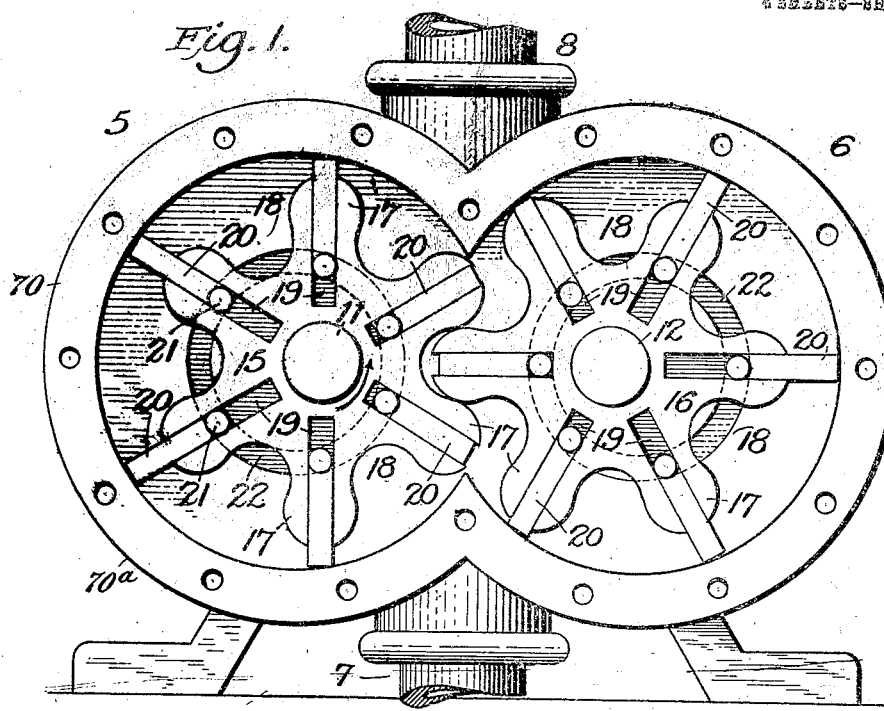

F. TOMPKINS.
PROPELLING AND STEERING APPARATUS.
APPLICATION FILED DEC. 30, 1908.

931,899.

Patented Aug. 24, 1909.
4 SHEETS—SHEET 1.

WITNESSES

INVENTOR
Franklin Tompkins
BY
Victor J. Evans
ATTORNEY

F. TOMPKINS.
PROPELLING AND STEERING APPARATUS.
APPLICATION FILED DEC. 30, 1908.
931,899.
Patented Aug. 24, 1909.
4 SHEETS—SHEET 2.
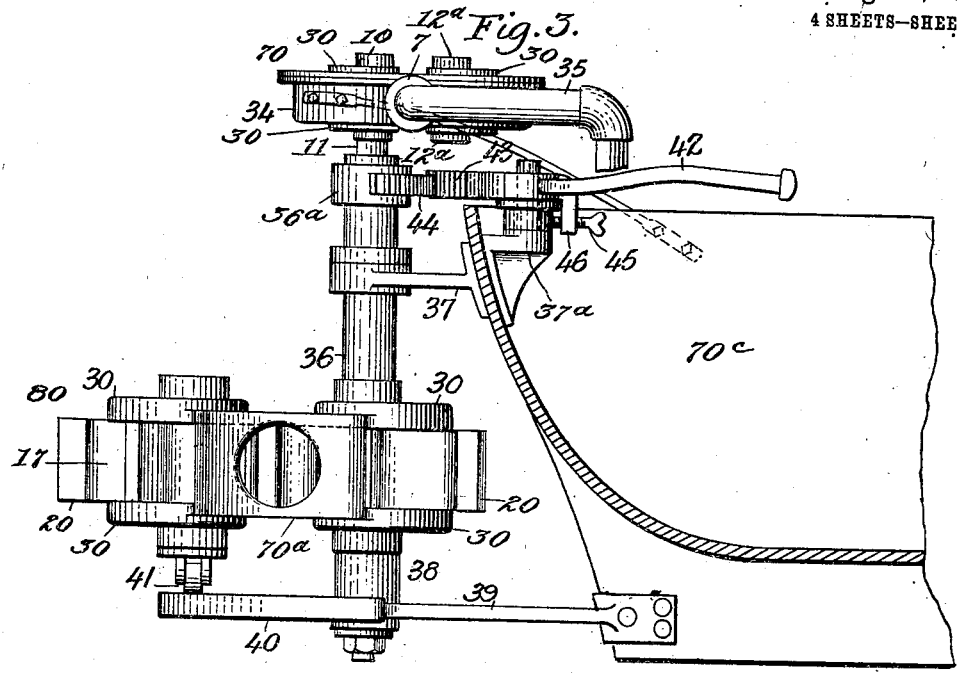
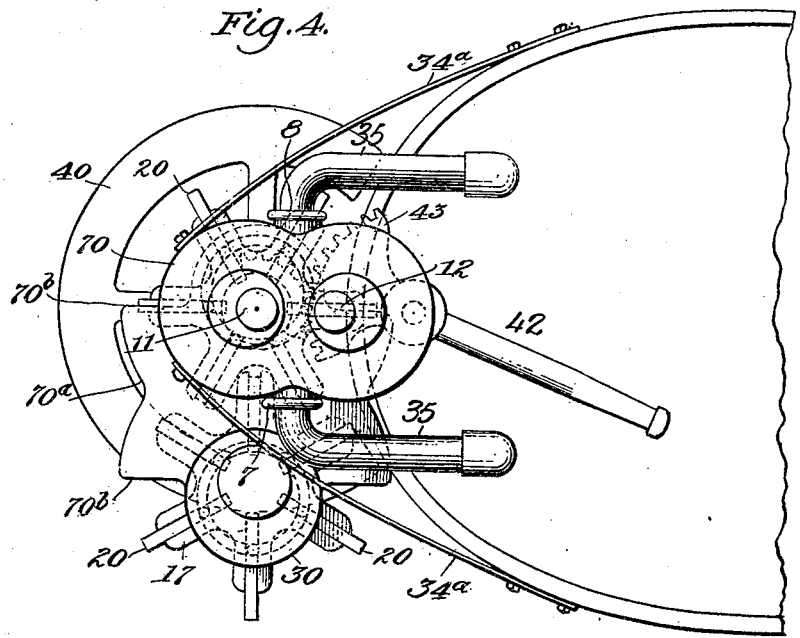
WITNESSES
INVENTOR
Franklin Tompkins.
BY
Victor J. Evans
ATTORNEY F. TOMPKINS.
PROPELLING AND STEERING APPARATUS.
APPLICATION FILED DEC. 30, 1908.
931,899.
Patented Aug. 24, 1909.
4 SHEETS—SHEET 3.
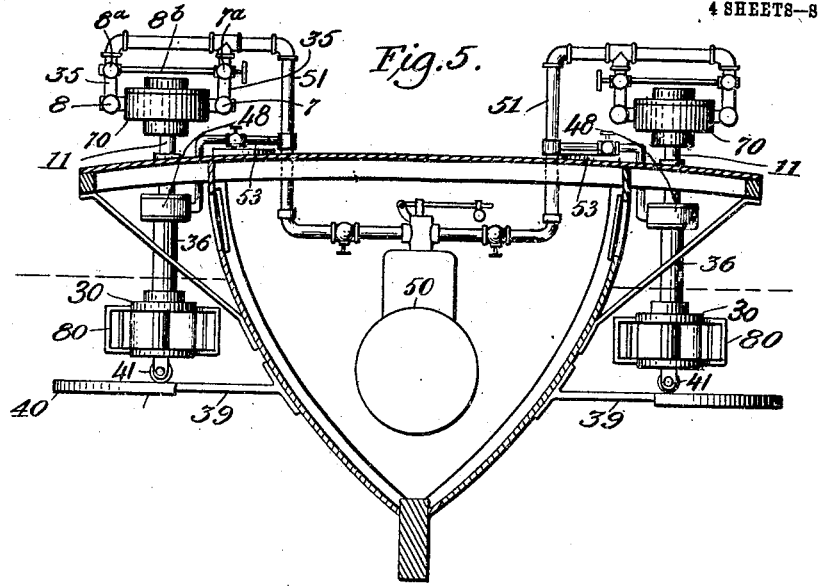
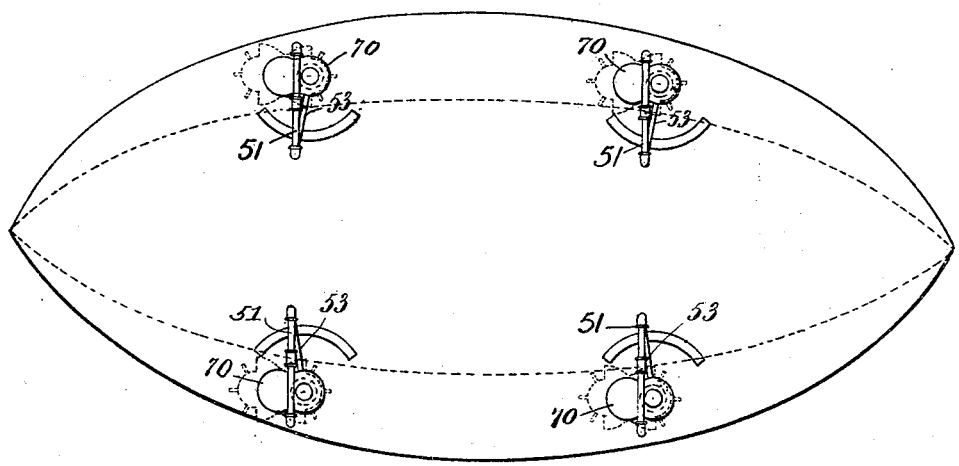
WITNESSES
INVENTOR
Franklin Tompkins
BY
Victor J. Evans
ATTORNEY

F. TOMPKINS.
PROPELLING AND STEERING APPARATUS.
APPLICATION FILED DEC. 30, 1908.

931,899.

Patented Aug. 24, 1909.
4 SHEETS—SHEET 4.

WITNESSES

INVENTOR
Franklin Tompkins
BY
Victor J Evans
ATTORNEY

UNITED STATES PATENT OFFICE.

FRANKLIN TOMPKINS, OF NEW DORP, NEW YORK.

PROPELLING AND STEERING APPARATUS.

931,899.

Specification of Letters Patent. Patented Aug. 24, 1909.

Application filed December 30, 1908. Serial No. 470,047.

*To all whom it may concern:*

Be it known that I, FRANKLIN TOMPKINS, a citizen of the United States, residing at New Dorp, in the county of Richmond and State of New York, have invented new and useful Improvements in Propelling and Steering Apparatus, of which the following is a specification.

This invention relates to propelling and guiding or steering apparatus for vessels of various kinds and classes including airships and to means for operating such apparatus; and the object of the invention is to provide an improved apparatus of the class specified which may be applied to vessels of various kinds and classes at the stern thereof, in the usual manner, or to the sides thereof and which may be so manipulated as to serve both as a propeller and for the purpose of guiding or steering the vessel; a further object being to provide an apparatus of the class and for the purpose specified which may be conveniently applied to airships, all as will hereinafter appear from the drawings and descriptions forming part of this application.

The means which I employ for operating or propelling and steering the apparatus comprises a construction or device similar to that of a rotary gear pump or engine, and may be used as a pump or engine for other purposes in addition to those herein shown and described, and this feature of my invention is not specifically claimed in this application, but is made the subject of another application for Letters Patent of the United States, filed by me on the 20th day of March, 1909, Ser. #484,609.

The invention which forms the basis of this application is fully disclosed in the following specification, of which the accompanying drawings form a part, in which the separate parts of my improvement are designated by suitable reference characters in each of the views, and in which:—

Figure 2:
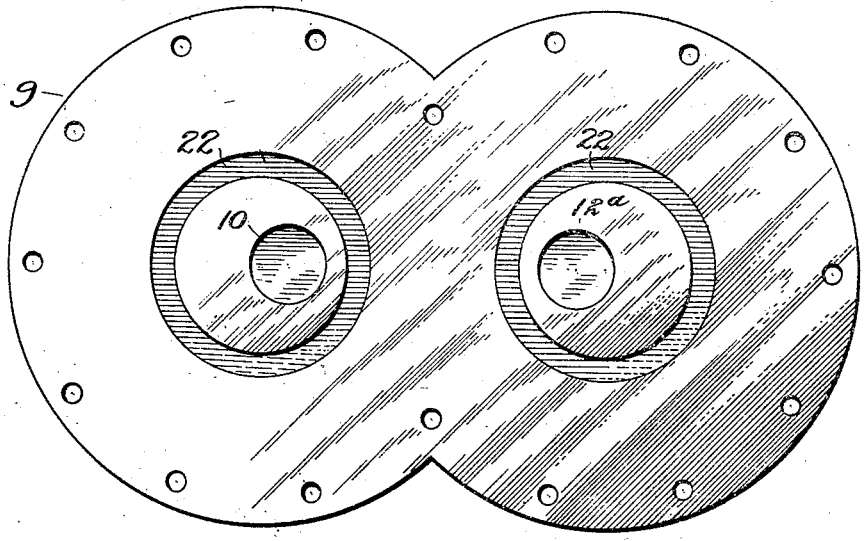

Figure 1 is a side elevation of the rotary motor device by which my improved propelling and steering apparatus is operated with one side plate removed; Fig. 2 an inside view of said plate; Fig. 3 a sectional side view of the steering portion of the hull of a vessel and showing my improved propelling and steering apparatus connected therewith and the rotary motor device by which it is operated; Fig. 4 a plan view of the construction shown in Fig. 3; Fig. 5 a transverse sectional view of the central part of the hull of a vessel and showing my improved propelling and steering apparatus applied to both sides thereof and the motors by which the apparatus is operated, Fig. 6 a plan view of the construction shown in Fig. 5, and;—Figs. 7 and 8 side and end views respectively showing my invention applied to an airship.

In the practice of my invention as shown in Figs. 1 and 2 of the drawings, I provide a motor or power device 70 made in the form of a rotary pump or engine, and comprising a casing $70^a$ consisting of two approximately cylindrical members 5 and 6 having an inlet 7 at the point where the two members are joined, and the casing consists of a body portion having sides 9.

Passing into one side of the casing and through one part thereof and fitting in a socket boss 10 at the other side of said casing is a shaft 11, and a corresponding shaft 12 is mounted in the other part of said casing and the ends thereof fit in socket bosses $12^a$ formed on the sides of said part.

The shaft 11 may be provided with a puley for transmitting power when the device s used as a pump, or to receive a belt to rotate said shaft when the device is used as a motor, these features of construction being not shown herein, but being shown and described in the application hereinbefore referred to.

The shafts 11 and 12 are provided with interlocking wheels 15 and 16 which comprise a hub and a series of arms 17 and corresponding sockets 18, and the arms 17 of one wheel fit in the corresponding sockets 18 of the other wheel, and when one of said wheels is rotated the other will be correspondingly rotated as will be readily understood. This rotation may be caused by the shaft 11 to which power may be applied when the device is used as a pump, or it may be caused by a blast of steam from the inlet 7 when the device is used as a motor.

The wheels 15 and 16 and the arms 17 thereof are provided with radial slots 19 in which are placed radially movable piston blades 20 provided at their inner ends or edges with lateral lugs 21, and the opposite sides 9 of the casing $70^a$ are provided with circular grooves 22 concentric with the separate parts of said casing but eccentric to the shafts 11 and 12, and the opposite sides of the casing $70^a$ are provided with circular bosses 30 in which said grooves are formed, and as the wheels 15 and 16 revolve the lugs 21 on the piston blades 20 operate in the grooves 22 and cause said blades to move radially in and out of the slots 19, and the outer edges of said blades contact with the inner circular walls of the separate parts of the casing and are operated on by steam or water in the manner of other devices of this class and according to whether the device is used as a motor or as a pump.

When the device is used as a pump the rotation of the shaft 11 in the direction of the arrow causes the rotation of the wheel 15, and the wheel 15 turns the wheel 16 and causes a suction at the inlet 7 and the water flows in at said inlet 7 and out at the outlet 8, the piston blades 20 operating to produce this result. When the device is used as a motor and operated by steam the movement of the various parts thereof will be the same, the steam entering through the inlet 7 and leaving at the outlet 8 thus forcing the wheels 15 and 16 to revolve. If it is desired to reverse the operation of the device the steam is admitted at 8 and discharged at 7 as will be readily understood, and this may be done by any desired form of apparatus, or by that shown and described in the application hereinbefore referred to.

In Figs. 3 and 4 of the accompanying drawings I have shown at 70$^c$ the stern portion of the hull of a vessel and have also shown at 80 a propeller made according to my invention, and this propeller is operated by the motor device 70 hereinbefore described. The propeller 80 is made in the same manner as the motor with the following exceptions. The casing 70$^a$ is placed in a horizontal position and the outer or opposite sides thereof are removed as shown at 70$^b$ so as to expose the arms 17 and blades 20 of the wheels 15 and 16. In this use of the device the stern of the vessel is provided with a top bracket or support 37 and a bottom bracket or support 39, and the bottom bracket or support is provided with an extension 40 which forms a segmental track or way on which a part of the propeller may rotate as hereinafter described. The propeller 80 is mounted between the brackets or supports 37 and 39, and the shaft 11 of the motor passes downwardly through the brackets or supports 37 and 39 and through one side part of the propeller and one of the wheels in the propeller, said wheels being the same as the wheels 15 and 16. The shaft 11 passes through a sleeve 36 mounted in the bracket or support 37 and provided at its upper end with a head 36$^a$ having a segmental gear 44, and another sleeve 38 is placed on the shaft 11 below the motor. The motor 70, supported in the manner shown and described is in a plane above the hull of the vessel, and secured within or on the hull of the vessel is a support 37$^a$ on which is pivoted a segmental gear 43 which operates in connection with the gear 44, and the gear 43 is provided with an arm 42 and a downwardly directed projection 46 through which is passed a set screw 45 which operates in connection with the support 37$^a$ to hold the gear 43 in any desired position. Steam pipes 35 are connected with the inlet 7 and outlet 8 of the motor, and one of these pipes serves to supply steam thereto and the other as an exhaust, and one of said pipes may be connected with any suitable steam supply or boiler within the hull of the vessel, and it will be understood that either of said pipes may serve for the purpose of supplying steam and any desired reversing apparatus may be employed, that shown and described in the application hereinbefore referred to, being particularly designed for this purpose. The motor 70 is also provided with side braces 34$^a$ which are connected therewith and with the hull of the vessel. That part of the propeller 80 opposite that through which the shaft 11 passes is provided with an anti-friction wheel or roller 41 adapted to travel on the segmental track or way 40 and to serve as an anti-friction support for the propeller in the operation thereof as hereinafter described. The sleeve 36 is formed integral with the casing 70$^a$ of the propeller 80 or secured thereto, and by means of the arm 42 of the gear 43 which serves as a tiller, the propeller 80 may be turned into different positions as will be readily understood, and the tiller may be locked in any desired position by the screw 45 or by any other preferred means.

In the construction shown in Figs. 3 and 4, my improvement is supposed to be applied to a small boat and the steering may be done by means of the arm 42, but it will be understood that when the apparatus is applied to large vessels the tiller may be operated by a small motor or in any desired way. With this construction, it will be apparent, that the boat may be propelled, and by manipulating the tiller arm 42 of the propeller may be swung into different positions so as to change the direction or course of the vessel as desired, and in Figs. 3 and 4 the propeller is shown in different positions.

In Figs. 5 and 6 of the accompanying drawings I have shown my improvement applied to the opposite sides of a boat, said boat being preferably of the ferryboat type, or being provided with overhanging side decks, and in this adaptation of the invention the brackets or supports 39 having the segmental or arc-shaped members 40 are employed, and two of the combined motors and propellers are employed, in the form of construction shown, at each side of the boat. The motors 70 are placed above the deck of the boat and the propellers 80 below the deck. The shafts 11 of the motors pass downwardly through the propellers the same as in the construction shown in Figs. 3 and 4, and said propellers or the casings thereof are provided with the sleeves 36, and the upper ends of these sleeves are provided with steam steering motors 48 for the purpose of turning the propellers 80 on the brackets or supports 39, and these steam steering motors 48 are provided with pipes 53 which are in communication with other steam supply pipes 51 which are connected with or communicate with a boiler 50, and the pipes 51 also connect with and operate the motors 70 by means of the pipes 35 the same as in the construction shown in Figs. 3 and 4, and the pipes 35 communicate with the inlet and outlet 7 and 8 of the motors and said pipes are provided with reversing valves 7ª and 8ª operated by a single valve rod 8ᵇ as shown and described in the application hereinbefore referred to, but this reversing mechanism may be of any desired construction.

Figure 7:
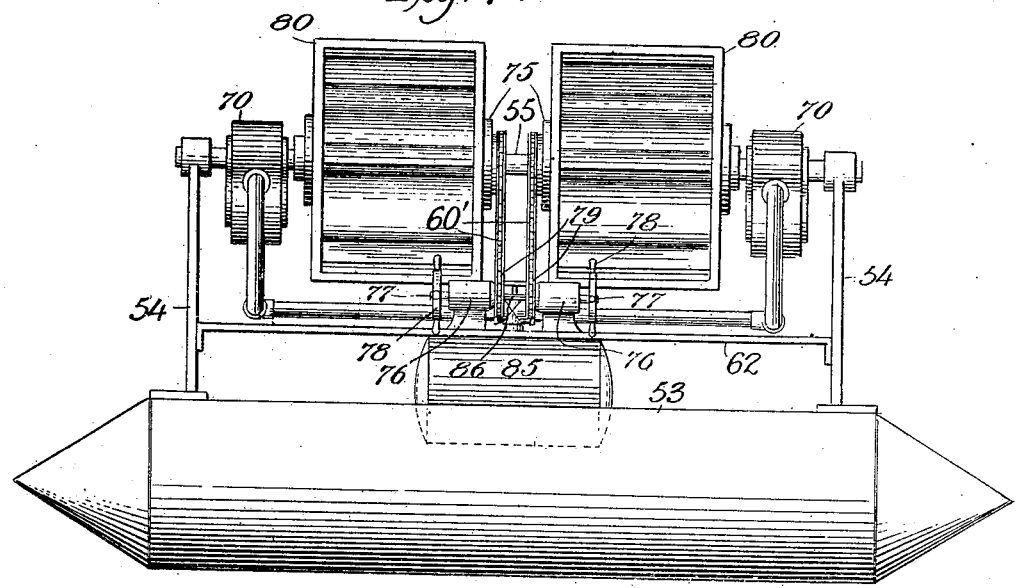
Figure 8:
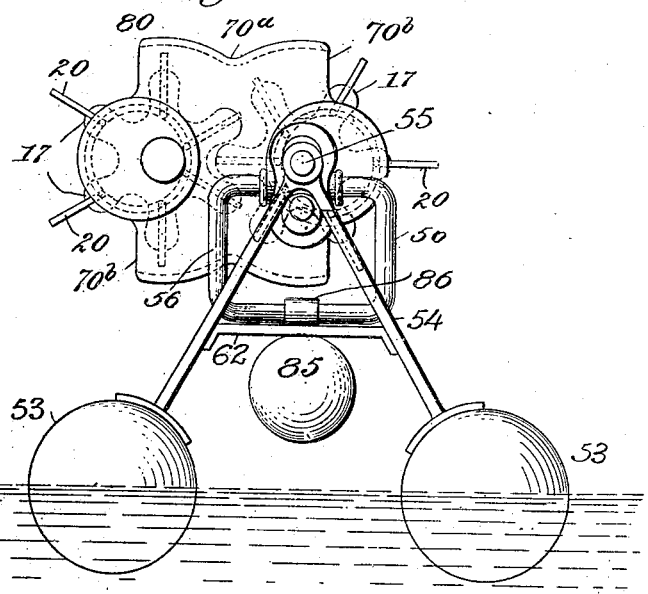

In Figs. 7 and 8 I have shown my improvement applied to airships, and in said figures I have shown two gas bags or balloon members 53 made in the usual or any preferred manner, and in practice I connect therewith a frame 54 having a deck portion 62, and in the top of the frame 54 is mounted a shaft 55 which takes the place of the shaft 11 shown in Fig. 3, and on this shaft two of the motors 70 are mounted and two of the propellers 80, the propellers being mounted between the motors. Connected with the motor 70 are pipes 56 which take the place of the pipes 35 shown in Figs. 3 and 4, and one of these pipes may serve as a supply and the other as an exhaust. The motor 70 may be run by steam, air under pressure, or in any other way, but in said figures of the drawing said pipes are connected with a high pressure gas or air receiver 85 by means of a suitable coupling or valve device 86, or the pipe connections and the reversing apparatus shown in Figs. 5 and 6 may be employed in this connection. In this form of construction the adjacent sides of the motors 80 are provided with sprocket gears 75 and on the deck 62 is placed suitable supports or bearings 76 in which are mounted shafts 77 provided with hand wheels 78, and the inner ends of the shafts 77 are provided with sprocket gears 79 and the sprocket gears 75 and 79 are geared in connection by chains 60, and by turning the wheels 78 the motors 80 may be thrown into different positions as will be readily understood.

It will be understood that the details of the construction of the motors 70 and propellers 80 are the same both in Figs. 5 and 6, and 7 and 8 as in Figs. 1 and 2, and 3 and 4.

My invention is not limited to the details of construction herein shown and described, and various changes therein and modifications thereof may be made, within the scope of the appended claims, without departing from the spirit of my invention or sacrificing its advantages, and I reserve the right to make such alterations therein as fairly come within the scope of the appended claims.

What I claim as new and desire to secure by Letters Patent is:

1. A propelling and steering mechanism for vessels which comprises a pair or pairs of intermeshing members adapted to be revolved in opposite directions in the buoying fluid, said members being provided with expanding and contracting blades which act upon the fluid during a part of a revolution of said members and react upon the vessel to propel the same, and means whereby one of a pair of intermeshing members may be partially rotated about the other for steering the vessel.

2. A propelling and steering mechanism for vessels which comprises a plurality of members adapted to be revolved in the buoying fluid, said members being provided with expanding and contracting blades which act upon the fluid during a part of a revolution of said members and react upon the vessel to move the same, and means for varying the direction of said reaction to steer the vessel by changing the relative positions of said members.

3. A propelling and steering mechanism for vessels which comprises a pair or pairs of members, each pair of members being partially inclosed in a casing and adapted to be revolved in opposite directions in the buoying fluid, said members being provided with expanding and contracting blades which act upon the fluid during a part of a revolution of said members and react upon the vessel to propel the same, and means whereby the casing and one member of a pair may be partially rotated around the other member of said pair to steer the vessel.

4. In a device of the character described, the combination with a casing composed of two partially cylindrical parts open at their outer sides and having concentric grooves in the ends thereof, a shaft carrying a slotted wheel eccentrically located in one of the parts, a driving shaft having a similar wheel eccentrically located in the other part and acting as the pivot on which the device may be rotated, a suitable supported motive shaft, and extensible blades mounted in the slots of said wheels and moved in and out by said concentric grooves.

In testimony whereof I affix my signature in presence of two witnesses.

FRANKLIN TOMPKINS.

Witnesses:
  MAE W. CLINTON,
  JAMES F. DUHAMEL.